United States Patent
Prokopenya et al.

(10) Patent No.: US 10,140,557 B1
(45) Date of Patent: Nov. 27, 2018

(54) INCREASING NETWORK TRANSMISSION CAPACITY AND DATA RESOLUTION QUALITY AND COMPUTER SYSTEMS AND COMPUTER-IMPLEMENTED METHODS FOR IMPLEMENTING THEREOF

(71) Applicants: Viktor Prokopenya, London (GB); Yury Hushchyn, Vilnius (LT); Alexander Lemeza, Minsk (BY)

(72) Inventors: Viktor Prokopenya, London (GB); Yury Hushchyn, Vilnius (LT); Alexander Lemeza, Minsk (BY)

(73) Assignee: Banuba Limited, Wan Chai (HK)

( * ) Notice: Subject to any disclaimer, the term of this patent is extended or adjusted under 35 U.S.C. 154(b) by 0 days.

(21) Appl. No.: 15/986,482

(22) Filed: May 22, 2018

Related U.S. Application Data

(60) Provisional application No. 62/509,906, filed on May 23, 2017.

(51) Int. Cl.
   *G06K 9/66* (2006.01)
   *G06N 3/08* (2006.01)
   (Continued)

(52) U.S. Cl.
   CPC ............ *G06K 9/66* (2013.01); *G06K 9/6227* (2013.01); *G06K 9/6267* (2013.01); *G06N 3/04* (2013.01); *G06N 3/0445* (2013.01); *G06N 3/08* (2013.01)

(58) Field of Classification Search
   CPC ............ G06F 3/04842; G06F 3/04845; G06K 9/00268; G06K 9/62; G06K 9/6256;
   (Continued)

(56) References Cited

U.S. PATENT DOCUMENTS

2017/0154420 A1*  6/2017  Barnes ................... G06T 5/003
2017/0270593 A1*  9/2017  Sherman ............ G06K 9/00268

OTHER PUBLICATIONS

Li et al., "Motion-Aware KNN Laplacian for Video Matting", Computer Vision (ICCV), 2013 IEEE International Conference, pp. 3599-3606.

(Continued)

*Primary Examiner* — Manuchehr Rahmjoo
(74) *Attorney, Agent, or Firm* — Greenberg Traurig, LLP

(57) ABSTRACT

In some embodiments, the present invention provides for an exemplary inventive system, including: a communication pipeline, including: at a first end of the communication pipeline: a first processor configured to: obtain a plurality of original content data units having a representative content associated with a subject; apply a trained artificial intelligence algorithm to identify: the representative content of the subject and original background content that is not associated with the subject; remove the original background content to reduce a volume of data being transmitted resulting in an increased capacity of the communication channel; encode and transmit each respective modified content data unit from the first end of the communication pipeline to a second end; a second processor configured to: receive and decode each respective modified content data unit; generate a respective artificial background content; and combine the representative content associated with the subject and the respective artificial background content to form each composite content data unit.

24 Claims, 6 Drawing Sheets

(51) Int. Cl.
*G06K 9/62* (2006.01)
*G06N 3/04* (2006.01)

(58) Field of Classification Search
CPC ........ G06N 3/08; G06N 5/04; G06Q 30/0251; G06Q 30/0631; G06T 11/001; G06T 11/206; G06T 15/00; G06T 2207/10024; G06T 2207/10064
USPC .......................................................... 382/155
See application file for complete search history.

(56) References Cited

OTHER PUBLICATIONS

Shen et al., "Deep Automatic Portrait Matting", ECCV 2016, Part I, LNCS 9905, pp. 92-107, 2016.
"OpenCV: How to Use Background Subtraction Methods" <<https://docs.opencv.org/3.4/c1/dc5/tutorial_background_subtraction.html>> retrieved May 22, 2018.
Nurhadiyatna et al., "Background Subtraction Using Gaussian Mixture Model Enhanced by Hole Filling Algorithm (GMMHF)", 2013 IEEE International Conference on Systems, Mans, and Cybernetics, pp. 4006-4011.

* cited by examiner

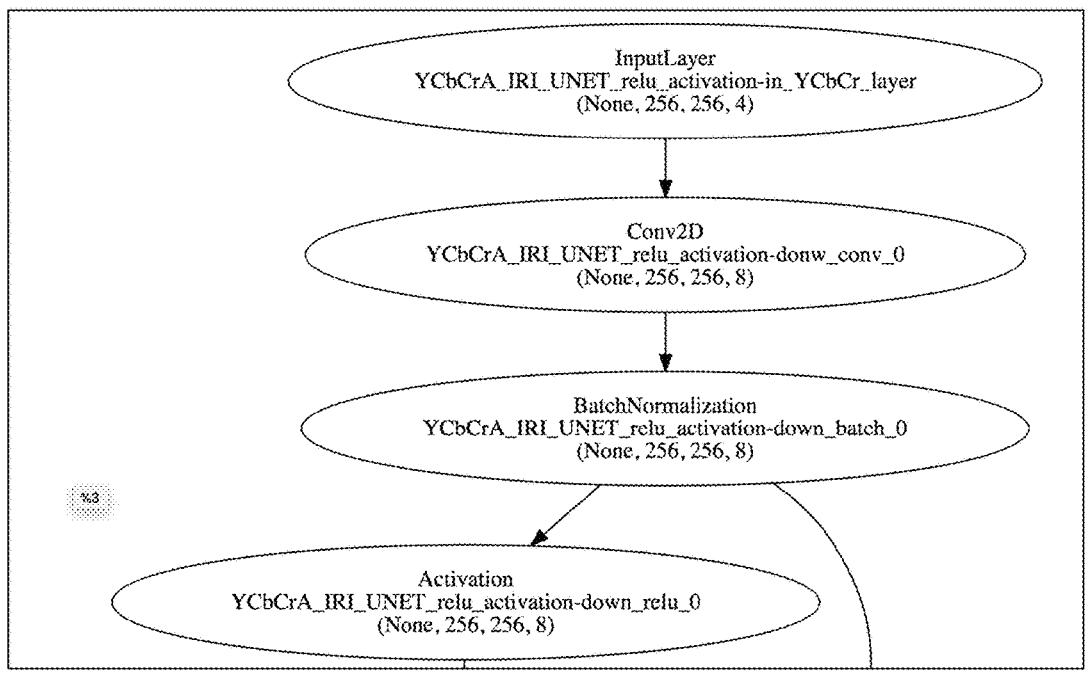
*FIG. 5*
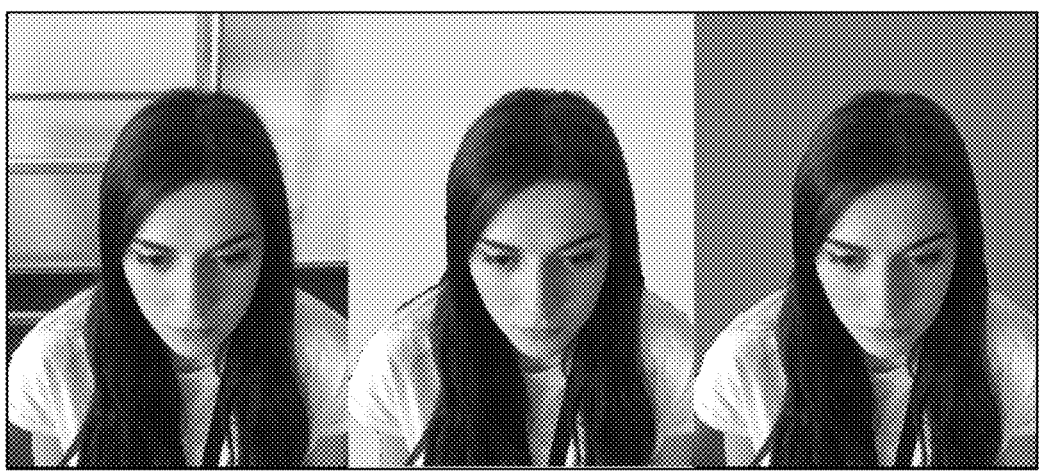
*FIG. 6A*   *FIG. 6B*   *FIG. 6C*

US 10,140,557 B1

INCREASING NETWORK TRANSMISSION CAPACITY AND DATA RESOLUTION QUALITY AND COMPUTER SYSTEMS AND COMPUTER-IMPLEMENTED METHODS FOR IMPLEMENTING THEREOF

CROSS-REFERENCE TO RELATED APPLICATIONS

This application claims benefit of U.S. provisional patent application Ser. No. 62/509,906 filed May 23, 2017, which is herein incorporated by reference for all purposes.

FIELD OF THE INVENTION

Generally the present disclosure is directed to increasing network transmission capacity and data resolution quality, and computer systems and computer-implemented methods for implementing thereof.

BACKGROUND

Data transmission (also data communication or digital communications) is the transfer of data (a digital bit stream) over a point-to-point or point-to-multipoint communication channel. Examples of such channels are copper wires, optical fibers, wireless communication channels, storage media and computer buses. A channel may be used to convey information, for example a digital bit stream, from one or several senders (or transmitters) to one or several receivers. A channel may have a certain capacity for transmitting information, often measured by its bandwidth in Hz or its data rate in bits per second.

SUMMARY OF THE INVENTION

In some embodiments, the present invention provides for an exemplary inventive computer-implemented method that includes at least the steps of: at a first end of a communication pipeline: obtaining, by at least one first processor, a plurality of original content data units having a representative content associated with at least one subject; applying, by the at least one first processor, to each original content data unit, at least one trained artificial intelligence algorithm to identify: i) the representative content associated with the at least one subject and ii) original background content that is not associated with the at least one subject; removing, by the at least one first processor, from each original content data unit, the original background content to form each respective modified content data unit only having the representative content associated with the at least one subject to reduce a volume of data being transmitted resulting in an increased capacity of the communication channel; encoding, by the at least one first processor, each respective modified content data unit in accordance with at least one data encoding-decoding methodology; and transmitting, by the at least one first processor, each respective modified content data unit from the first end of the communication pipeline to a second end of the communication pipeline; at the second end of the communication pipeline: receiving, by at least one second processor, each respective modified content data unit; decoding, by the at least one second processor, each respective modified content data unit in accordance with at least one data encoding-decoding methodology; generating, by the at least one second processor, for each respective modified content data unit, a respective artificial background content; and combining, by the at least one second processor, for each respective modified content data unit, the representative content associated with the at least one subject and the respective artificial background content to form each composite content data unit.

In some embodiments, the at least one trained artificial intelligence algorithm is selected from the group consisting of:
i) a trained convolutional neural network algorithm,
ii) a trained feedforward neural network algorithm,
iii) a trained recurrent neural network algorithm, and
iv) a trained modular neural network algorithm.

In some embodiments, the trained convolutional neural network algorithm is a U-Net type trained convolutional neural network algorithm.

In some embodiments, the representative content of the at least one subject is a visual appearance of at least one person.

In some embodiments, the visual appearance of the at least one subject is a face of the at least one person.

In some embodiments, the at least one trained artificial intelligence algorithm has been trained based on an image database, including images of people that were taken at a plurality of settings and a plurality of conditions.

In some embodiments, the at least one trained artificial intelligence algorithm has been trained based on a multi-dimensional morphable facial model.

In some embodiments, the step of applying, to each original content data unit, the at least one trained artificial intelligence algorithm further includes: assigning, by a labeling component of the at least one trained artificial intelligence algorithm, a particular label to the at least one subject, classifying, by a classification component of the at least one trained artificial intelligence algorithm, pixels of a visual content of each original content data unit into at least three classes: i) foreground pixels, ii) background pixels, and iii) unknown pixels; matting, by a matting component of the at least one trained artificial intelligence algorithm, the foreground pixels and the background pixels of the visual content of each original content data to an aligned average shape mask associated with the at least one subject to identify the representative content associated with the at least one subject.

In some embodiments, the method further including: training, by at least one third processor, at least one artificial intelligence algorithm based on an image database until a loss function reaches a pre-determined acceptable threshold to obtain the at least one trained artificial intelligence algorithm.

In some embodiments, the pre-determined acceptable threshold varies from 1 to 15 percent.

In some embodiments, the pre-determined acceptable threshold is between 1 and 5 percent.

In some embodiments, the respective artificial background content includes at least one of:
i) at least one uniform color,
ii) at least one color gradient, and
iii) at least one artificial image.

In some embodiments, the present invention provides for an exemplary inventive system that includes at least components of: a communication pipeline, including: at a first end of the communication pipeline: at least one first processor; where the at least one first processor is configured to: obtain a plurality of original content data units having a representative content associated with at least one subject; apply, to each original content data unit, at least one trained artificial intelligence algorithm to identify: i) the representative content associated with the at least one subject and ii)

original background content that is not associated with the at least one subject; remove, from each original content data unit, the original background content to form each respective modified content data unit only having the representative content associated with the at least one subject to reduce a volume of data being transmitted resulting in an increased capacity of the communication channel; encode each respective modified content data unit in accordance with at least one data encoding-decoding methodology; and transmit each respective modified content data unit from the first end of the communication pipeline to a second end of the communication pipeline; at the second end of the communication pipeline: at least one second processor; where the at least one second processor is configured to: receive each respective modified content data unit; decode each respective modified content data unit in accordance with at least one data encoding-decoding methodology; generate, for each respective modified content data unit, a respective artificial background content; and combine, for each respective modified content data unit, the representative content associated with the at least one subject and the respective artificial background content to form each composite content data unit.

BRIEF DESCRIPTION OF THE DRAWINGS

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

FIGS. 1-6C are representative of some exemplary aspects of the present invention in accordance with at least some principles of at least some embodiments of the present invention.

DESCRIPTION OF EXEMPLARY EMBODIMENTS

Figure 1:
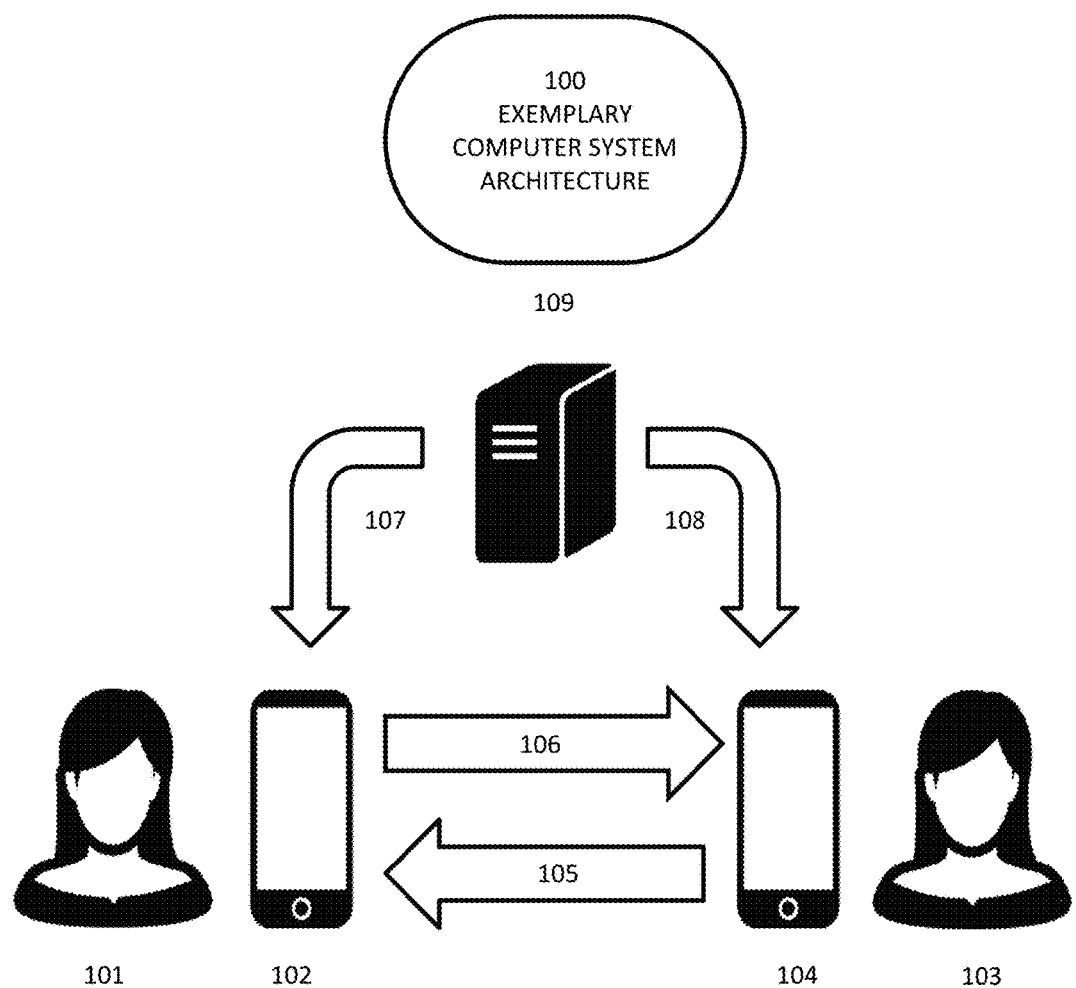

Among those benefits and improvements that have been disclosed, other objects and advantages of this invention can become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the present invention is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention. Further, when a particular feature, structure, or characteristic is described in connection with an implementation, it is submitted that it is within the knowledge of one skilled in the art to affect such feature, structure, or characteristic in connection with other implementations whether or not explicitly described herein.

The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" means that events and/or actions can be triggered and/or occur without any human intervention. In some embodiments, events and/or actions in accordance with the present invention can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, the inventive specially programmed computing systems with associated devices are configured to operate in the distributed network environment, communicating over a suitable data communication network (e.g., the Internet, etc.) and utilizing at least one suitable data communication protocol (e.g., IPX/SPX, X.25, AX.25, AppleTalk™, TCP/IP (e.g., HTTP), etc.). Of note, the embodiments described herein may, of course, be implemented using any appropriate hardware and/or computing software languages. In this regard, those of ordinary skill in the art are well versed in the type of computer hardware that may be used, the type of computer programming techniques that may be used (e.g., object oriented programming), and the type of computer programming languages that may be used (e.g., C++, Objective-C, Swift, Java, Javascript). The aforementioned examples are, of course, illustrative and not restrictive.

As used herein, the terms "image(s)" and "image data" are used interchangeably to identify data representative of visual content which includes, but not limited to, images encoded in various computer formats (e.g., ".jpg", ".bmp," etc.), streaming video based on various protocols (e.g., Real-time Streaming Protocol (RTSP), Real-time Transport Protocol (RTP), Real-time Transport Control Protocol (RTCP), etc.), recorded/generated non-streaming video of various formats (e.g., ".mov," ".mpg," ".wmv," ".avi," ".flv," ect.), and real-time visual imagery acquired through a camera application on a mobile device.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

As used herein, the term "user" shall have a meaning of at least one user.

For example, FIG. 1 illustrates an exemplary computer system environment 100 incorporating certain embodiments of the present invention. As shown in FIG. 1, environment 100 may include a first user 102, who uses a mobile device 102 to communicate with a second user 103, having a mobile device 104. FIG. 1 also illustrates that the exemplary computer system environment 100 incorporates a server 109 which is configured to operationally communicate with the mobile devices 102 and 104. Other devices may also be included. For example, in some embodiments, the mobile devices 102 and 104 may include any appropriate type of mobile devices, such as mobile phones, smartphones and tablets. Further, the mobile devices 102 and 104 may be any appropriate devices capable of to take still images (e.g., "selfie"-type images) or video with equipped front camera. Further, the server 109 may include any appropriate type of server computer or a plurality of server computers for providing technical ability to perform external calculations and simulations in order to improve models used for mobile application, to store users' data or additional content for the application.

For example, in some embodiments, the users 101 and 103 may interact with the mobile devices 102 and 104 by means of application control(s) and front/back camera(s). Each user may be a single user or a plurality of users. Mobile devices 102/104 and/or server 109 may be implemented on any appropriate computing circuitry platform as detailed herein.

In some embodiments, the inventive methods and the inventive systems of the present inventions can be incorporated, partially or entirely into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In some examples, visual data of the first user may be captured via an exemplary camera sensor-type imaging device of the mobile device 102 or the like (e.g., a complementary metal oxide-semiconductor-type image sensor (CMOS) or a charge-coupled device-type image sensor (CCD)), without the use of a red-green-blue (RGB) depth camera and/or microphone-array to locate who is speaking. In other examples, an RGB-Depth camera and/or microphone-array might be used in addition to or in the alternative to the camera sensor. In some examples, the exemplary imaging device of the mobile device 102 may be provided via either a peripheral eye tracking camera or as an integrated a peripheral eye tracking camera in backlight system 100.

While some embodiments of the present invention are described herein based on the processing and transmission of visual content data, it should be understand that the given illustrative description and examples do not limit the present invention to the visual data and it should be understand that, in at least some embodiments, the present invention also extends to processing and transmitting of audio data either alone or in combination with the visual data.

In some embodiments, as shown in FIG. 1, processed and encoded video streams may be (105) and (106). In some embodiments, the server (109) can be configured to generate a synthetic multi-dimensional morphable face database (an exemplary morphable face model) with predefined set of meta-parameters and train at least one inventive Artificial Intelligence (AI) algorithm of the present invention based on the synthetic multi-dimensional morphable face database. In some embodiments, the server (109) can be configured to generate the exemplary synthetic face database which can include 3D synthetic faces based on or derived from the FaceGen library (https://facegen.com) by Singular Inversions Inc. (Toronto, Calif.), the Unity3D software (Unity Technologies ApS, San Francisco, Calif.), and/or any other software suitable for rendering face model of the suitable quality.

In some embodiments, the exemplary server (109) may be further configured to utilize one of machine learning models/techniques (e.g., decision trees, boosting, support-vector machines, neural networks, nearest neighbor algorithms, Naive Bayes, bagging, random forests, etc.), face alignment models/techniques, and the 3D morphable facial models/techniques, such as, but not limited to, respective types of models and/or techniques provided in U.S. patent application Ser. No. 15/881,353 which is incorporated herein by reference for at least this specific purpose.

In some embodiments, the server (109) can be configured to store a library of real photographs or/and videos suitable for training at least one inventive AI algorithm.

In some embodiments, the exemplary implementation of the present invention can be a C++ implementation of a command-line tool/application that can be run on, for example, the server 109. In some embodiments, the exemplary illustrative methods and the exemplary illustrative systems of the present invention are specifically configured to generate all training parameter sets (e.g. larger ranges of tilt, roll, pan angles, etc.). In some embodiments, the training data can be in the form of a database of images coupled with xml description files. In some embodiments, the server 109 is configured to transmit, via 107 and 108, an exemplary trained inventive model to the mobile devices 102 and 104.

In some embodiments, the input data (e.g., input video and/or audio data) may include any suitable source of the video contents and may contain data from various sources. In some embodiments, the content of the input video (e.g., the video stream of FIG. 2) may include both video data and metadata. In some embodiments, plurality of frames may be associated with the video contents and may be provided to other modules for processing. In some embodiments, at least one picture may also be included in a frame.

Figure 2:
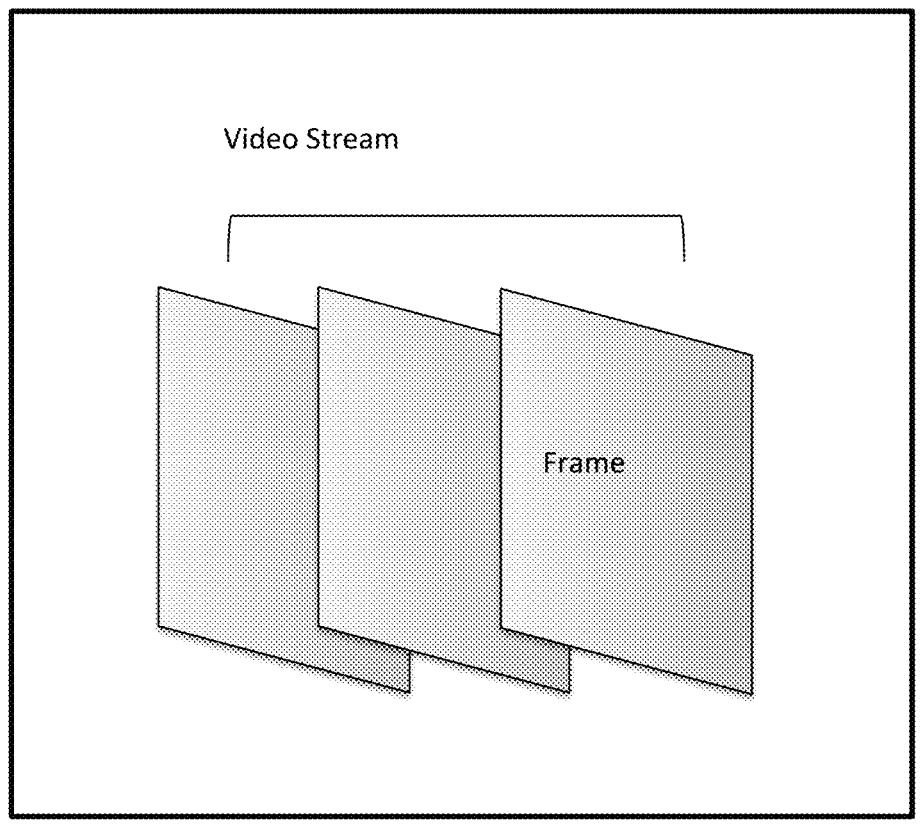

As shown in FIG. 2, an exemplary input video stream captured by the exemplary camera (e.g., a front camera of a mobile personal smartphone) can be divided into frames. For example, a typical movie sequence is an interleaved format of a number of camera shots, and a camera take is a continuous recorded performance with a given camera setup. Camera registration, as used herein, may refer to registration of different cameras capturing video frames in a video sequence/stream. The concept of camera registration is based on the camera takes in reconstruction of video edits. A typical video sequence is an interleaved format of a number of camera shots, and a camera take is a continuous recorded performance with a given camera setup. By registering each camera from the incoming video frames, the original interleaved format can be separated into a number of sequences with each corresponding to a registered camera that is aligned to the original camera setup.

As referenced herein, the term "subject" may refer to a living subject (e.g., person, animal, etc.) or to a physical subject (e.g., vase, table, car, etc.).

As referenced herein, the term "subjects" may refer to living subjects (e.g., people, animals, etc.), physical subjects (e.g., vases, tables, cars, etc.), or both.

In some embodiments, the exemplary inventive computer engine system is programmed/configured to extract a subject's visual information from content data unit(s) of the content (e.g., video frame(s), video stream(s), image(s), etc.) and discard the remaining "background" data (e.g., visual and/or audio data) which might neither be stored nor encoded. For example, in some embodiments, the exemplary inventive computer engine system and the exemplary inventive processing methodology may allow to reduce the volume of data being transmitted, and thus, minimize a bandwidth impact on network (i.e., increasing transmission capacity of the network) and/or, based on a given network and/or channel's capacity, allow to achieve higher video and/or audio resolution.

Figure 3A:
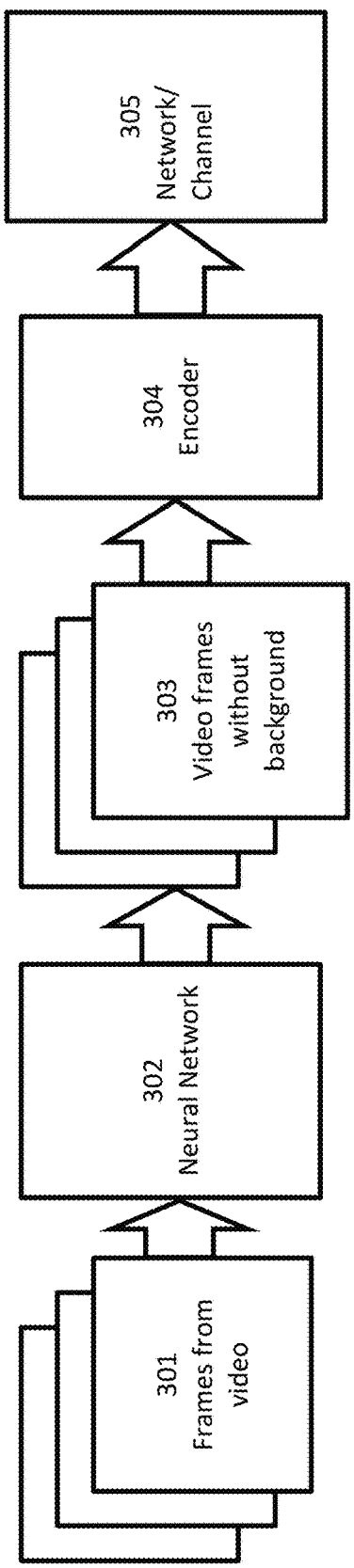
Figure 3B:
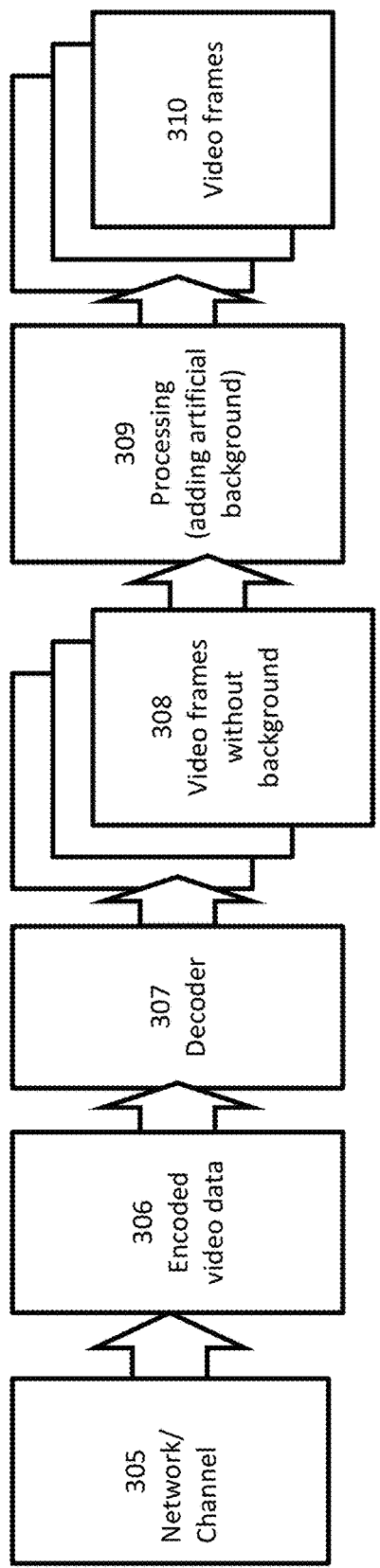

FIGS. 3A-3B illustrate an exemplary inventive methodology of an inventive processing pipeline managed by an exemplary inventive computer engine system programmed/configured for enhancing video data in accordance with at least some principles of the present invention. For example, FIG. 3A illustrates an encoding part of the exemplary inventive processing pipeline. In some embodiments, an exemplary content (301), such as but not limited to, real-time-acquired video frame(s), may be processed by an exemplary inventive AI algorithm module (302) to separate subject(s)' data (e.g., living beings (e.g., human(s), animal (s)), etc.) from the background. In some embodiments, the exemplary inventive AI algorithm module (302) executes at least one exemplary inventive AI algorithm that may be based on at least one of a convolutional neural network algorithm (e.g., fully convolutional neural network algorithm), a feedforward neural network algorithm, a recurrent neural network algorithm, a modular neural network algorithm, or another similarly suitable algorithm. In some embodiments, the subject data (e.g., visual and/or audio data related to one or more subjects), extracted by the exemplary inventive AI algorithm module (302), may be further encoded for transmission by an exemplary encode module (304). In some embodiments, the exemplary inventive methodology is, first, to extract/segment the subject data from all content data units of a particular portion of the related content (e.g., frame(s)) to be transmitted to a particular destination at a particular time, and then, to encode the entire portion of the modified subject data by the exemplary encode module (304). In some embodiments, the exemplary inventive methodology is to extract/segment the subject data on unit-by-unit basis (e.g., video frame-by-video-frame basis) and then, to encode by the exemplary encode module (304) on the unit-by-unit basis as well. In some embodiments, the exemplary encode module (304) may utilize one or more data encoding-decoding methodologies to encode the modified content data units. In some embodiments, the encoding-decoding methodologies may include content-related algorithms/protocols, transmission-related algorithms/protocols, or both. For example, exemplary content-related algorithms may include, without limitation, one or more of: H.264, ZRLE, VC2, H.261, H.262, H.263, MPEG4, VP9 and any other similarly suitable algorithm. After, the subject data has been encoded, the exemplary inventive computer engine system programmed/configured for transmitting, in whole or in part, such encoded data (306) over a computer network/channel (305).

FIG. 3B illustrates a decoding part of the exemplary inventive processing pipeline. In some embodiments, an exemplary decode module (307) is programmed/configured to receive the encoded subject data (306), decode such data and transform back into the corresponding content data units of the content (e.g., video frames) that do not contain background (308). In some embodiments, an exemplary inventive background-adding module (309) may be programmed/configured to add an artificial background and output the resulting composite visual content (310) to an input/output module/device. In some embodiments, the exemplary inventive background-adding module (309) may be programmed/configured to overlay the artificial background with the portrait pixels. In some embodiments, the artificial background may include uniform colors, gradients, artificial images (e.g., computer-generated background for selfie-type image), etc.

In some embodiments, the exemplary inventive background-adding module (309) may be programmed/configured to utilize a blend mode to mix layers by using the top layer alone (subject(s) visual data), without mixing its colors with the layer beneath it (background). In some embodiments, the exemplary inventive background-adding module (309) may be programmed/configured to utilize one or more other suitable blending techniques (modes) which may be, but not limited to: dissolving, multiplying, screening, overlaying, and other similar suitable techniques. For example, in the dissolve mode, the exemplary inventive background-adding module (309) may be programmed/configured to utilize to take random pixels from both layers. For example, in case of a high opacity, most pixels may be taken from the top layer. In case of a low opacity, most pixels may be taken from the bottom layer. In the dissolve mode, the exemplary inventive background-adding module (309) may be programmed/configured to not use anti-aliasing, resulting in the visual output that may look grainy and/or harsh. In case of the multiply blend mode, the exemplary inventive background-adding module (309) may be programmed/configured to multiply numbers for each pixel of the top layer with the corresponding pixel for the bottom layer which may result in a darker visual output. In case of the screen blend mode, the exemplary inventive background-adding module (309) may be programmed/configured to invert values of pixels in the two layers, then, multiply them, and then invert again which yields a brighter visual output which is the opposite of the multiplying mode result. In case of the overlay mode, the exemplary inventive background-adding module (309) may be programmed/configured to combine the multiply and screen blend modes such that, for example, parts of the top layer where the base layer is light would become lighter, parts where the base layer is dark would become darker, and areas where the top layer are mid grey would be unaffected.

Figure 4:
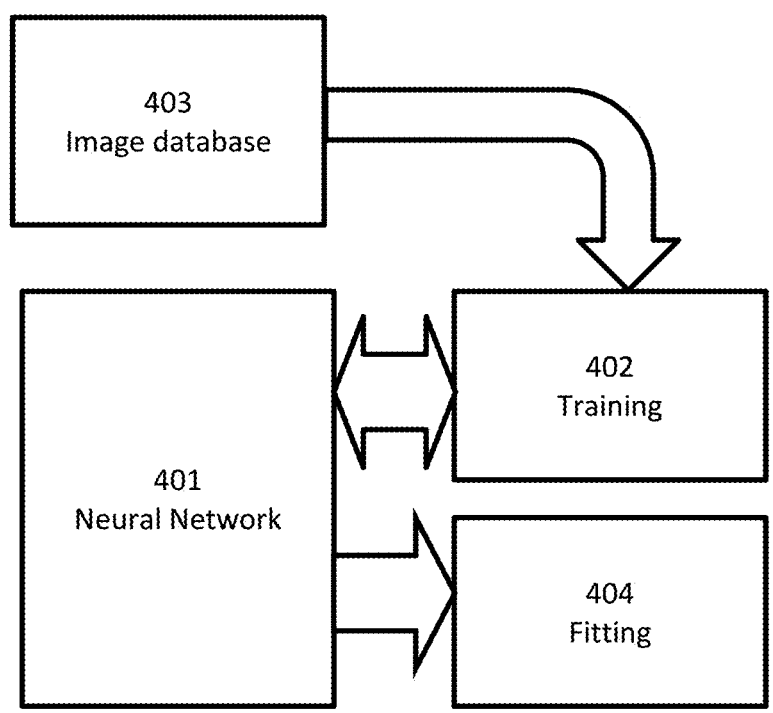

FIG. 4 illustrates an exemplary operation flow diagram for training the exemplary inventive AI algorithm. For example, the exemplary AI algorithm (401) (e.g., neural network) may be trained (402) using an exemplary image database (403). In some embodiments, such exemplary image database may contain portrait images of people taken in a wide range of settings and/or conditions such as, but not limited to, lighting, rotation angles, scales, translates, camera lens distortion, backgrounds, etc. In some embodiments, such exemplary image database may contain any synthetic morphable face database.

In some embodiments, the exemplary inventive computer engine system is programmed/configured to then apply the trained neural network (or a combination of neural networks, or a combination of neural network(s) with other suitable algorithm (401) to fit (404) the content data units of actual content (e.g., video frames from the real-time video).

An Illustrative Example of Applying the Exemplary Inventive AI Algorithm Based on Neural Network in Accordance with the Present Invention Detailed Herein.

For example, an exemplary input may be a portrait image (a content data unit of visual content) and an exemplary output is a portrait separated from a background. In some embodiments, the exemplary inventive neural network-based algorithm may include the labeling, trimap and matting parts. For example, the labeling part may be performed by any suitable neural network (e.g., convolutional neural network (CNN), etc.) that has been trained to associate particular identified subject(s) within the visual content with a particular class label (e.g., a person, a person's face, a car, etc.). At this step, the probability is that each image pixel may belong to foreground, background or another unknown class. In one example, the exemplary inventive computer engine system may be programmed/configured to assume that the trimap consists of pixels (or regions) divided into these three classes. In one example, the exemplary inventive computer engine system may be programmed/configured to then utilize an exemplary AI labelling component (e.g., the particularly configured neural network) to predict classes or/and the probability that each pixel belongs to these classes. Therefore, in accordance with this illustrative non-limiting example, the neural network produces three channels according to the three classes of pixels and an additional channel of a shape mask which may be passed to the exemplary inventive AI algorithm for further quality improvement. In some embodiments, the shape mask may be programmed/configured based on principle that a typical portrait includes a head and a part of shoulder, arm, and upper body. Initially, this channel may be generated by computing an aligned average shape mask from the training database and passed to the neural network in addition to the image. During the matting stage, the foreground and background channels are used to transform the exemplary shape mask, which, after a number of iterations (e.g., 1-10, 10-20, or more) may result in the portrait separated from the background.

In some embodiments, the exemplary inventive AI may be trained until a loss function reaches the acceptable value/threshold (e.g., 0.99 (1%), 0.98 (2%), 0.97 (3%), 0.96 (4%), 0.95 (5%), . . . , 0.90 (10%), . . . 0.85 (15%), etc.). In some embodiments, the loss function may measure an error between a predicted alpha matte and a ground truth. In some embodiments, the error may be calculated as L2- and/or L1-norm distances.

FIG. 5 shows an exemplary architecture of the exemplary inventive neural network utilized by in accordance with one or more principles of the present invention. The illustrative example of FIG. 5 is provided based on, but not limited to, YCbCr color space that is defined in the ITU-R BT.601-5 and ITU-R BT.709-5 standards of ITU (International Telecommunication Union). For example, these standards provide definitions for coefficients of conversion between RGB and YCbCr color spaces, for normalization and quantization of digital signals. Referring to FIG. 5, the YCbCrA color components are:

"Y" corresponds to Y luma value,
"Cb" corresponds to Cb chroma value,
"Cr" corresponds to Cr chroma value, and
"A" corresponds to alpha value that ranges from '0' (transparent) to '1' (opaque).

Further referring to FIG. 5, the exemplary steps of the inventive AI algorithm based on the neural network may include at least the following steps. An exemplary first inventive step of image reduction to a standard view (Step 1) during which, for example, content data units of visual content (e.g., images) are corrected for rotation(s) and/or translated, so that the content data units (e.g., images) have the same position in the same coordinate system (e.g., pitch=0, roll=0, yaw=0, x=image_centre_x, y=image_centre_y). In some embodiments, during the step of the image reduction, other suitable parameters, such as, but not limited to, brightness and/or contrast may be standardized as well.

The next exemplary inventive step (Step 2) may include applying an exemplary inventive convolutional neural network (CNN) of the U-Net type as, for example, illustrated in FIG. 5.

The next exemplary inventive step may include post-processing of the neural network output image (Step 3). At this stage, the result of the inventive segmentation is applied as a "prior", or a starting pattern, for the segmentation of the next content data unit (e.g., frame). In some embodiments, the post-processing may include removal of misrecognized image pixels In some embodiments, the exemplary overall inventive method, in general, may be described, without being limited to, as (Step 1 for content data unit 1)=>(Step 2 for content data unit 1)=>(Step 3 for content data unit 1)=> . . . =>(Step 1 for content data unit n)=>(Step 2 for content data unit n)=>(Step 3 for content data unit n).

FIGS. 6A-6C are screenshots that illustrate an exemplary outcome of an exemplary inventive processing performed by the exemplary inventive computer engine system. For example, the left panel (FIG. 6A) shows an original visual image/frame, the middle panel (FIG. 6B) shows a result of a potential manual segmentation, and the right panel (FIG. 6C) shows the exemplary outcome of the exemplary inventive processing performed by the exemplary inventive computer engine system in accordance with at least some principles of the present invention detailed herein.

In some embodiments, visual content may be part of mobile and/or computer applications for video calls, chats and/or conferences.

Further, in some embodiments, the exemplary computer engine system of the present invention (FIGS. 3A-3B) may be programmed/configured such that some step(s) performed at the mobile devices 102/104 and some step(s) are performed at the server 109.

In some embodiments, for example, the exemplary computer engine system of the present invention (FIGS. 3A-3B) may include or be operationally connected to a Graphics subsystem, such as, but not limited to, a graphics processing unit (GPU) or a visual processing unit (VPU), which may perform processing of images such as still or video for display. In some embodiments, analog and/or digital interfaces may be used to communicatively couple the exemplary Graphics subsystem and a display. For example, the interface may be any of a High-Definition Multimedia Interface, DisplayPort, wireless HDMI, and/or wireless HD compliant techniques. In some embodiments, the exemplary Graphics subsystem may be integrated into a processor or a chipset. In some implementations, the exemplary Graphics subsystem may be a stand-alone card communicatively coupled to the chipset.

In some embodiments, the exemplary computer engine system 300 may communicate via one or more radios modules capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, one or more radios modules may operate in accordance with one or more applicable standards in any version.

In various implementations, the final output (310) of the exemplary computer engine system of the present invention may also be displayed on a screen which may include any television type monitor or display. In various implementations, the display may include, for example, a computer display screen, touch screen display, video monitor, television-like device, and/or a television. In various implementations, the display may be digital and/or analog. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, the present invention provides for an exemplary inventive computer-implemented method that includes at least the steps of: at a first end of a communication pipeline: obtaining, by at least one first processor, a plurality of original content data units having a representative content associated with at least one subject; applying, by the at least one first processor, to each original content data unit, at least one trained artificial intelligence algorithm to identify: i) the representative content associated with the at least one subject and ii) original background content that is not associated with the at least one subject; removing, by the at least one first processor, from each original content data unit, the original background content to form each respective modified content data unit only having the representative content associated with the at least one subject to reduce a volume of data being transmitted resulting in an increased capacity of the communication channel; encoding, by the at least one first processor, each respective modified content data unit in accordance with at least one data encoding-decoding methodology; and transmitting, by the at least one first processor, each respective modified content data unit from the first end of the communication pipeline to a second end of the communication pipeline; at the second end of the communication pipeline: receiving, by at least one second processor, each respective modified content data unit; decoding, by the at least one second processor, each respective modified content data unit in accordance with at least one data encoding-decoding methodology; generating, by the at least one second processor, for each respective modified content data unit, a respective artificial background content; and combining, by the at least one second processor, for each respective modified content data unit, the representative content associated with the at least one subject and the respective artificial background content to form each composite content data unit.

In some embodiments, the at least one trained artificial intelligence algorithm is selected from the group consisting of:
i) a trained convolutional neural network algorithm,
ii) a trained feedforward neural network algorithm,
iii) a trained recurrent neural network algorithm, and
iv) a trained modular neural network algorithm.

In some embodiments, the trained convolutional neural network algorithm is a U-Net type trained convolutional neural network algorithm.

In some embodiments, the representative content of the at least one subject is a visual appearance of at least one person.

In some embodiments, the visual appearance of the at least one subject is a face of the at least one person.

In some embodiments, the at least one trained artificial intelligence algorithm has been trained based on an image database, including images of people that were taken at a plurality of settings and a plurality of conditions.

In some embodiments, the at least one trained artificial intelligence algorithm has been trained based on a multi-dimensional morphable facial model.

In some embodiments, the step of applying, to each original content data unit, the at least one trained artificial intelligence algorithm further includes: assigning, by a labeling component of the at least one trained artificial intelligence algorithm, a particular label to the at least one subject, classifying, by a classification component of the at least one trained artificial intelligence algorithm, pixels of a visual content of each original content data unit into at least three classes: i) foreground pixels, ii) background pixels, and iii) unknown pixels; matting, by a matting component of the at least one trained artificial intelligence algorithm, the foreground pixels and the background pixels of the visual content of each original content data to an aligned average shape mask associated with the at least one subject to identify the representative content associated with the at least one subject.

In some embodiments, the method further including: training, by at least one third processor, at least one artificial intelligence algorithm based on an image database until a loss function reaches a pre-determined acceptable threshold to obtain the at least one trained artificial intelligence algorithm.

In some embodiments, the pre-determined acceptable threshold varies from 1 to 15 percent.

In some embodiments, the pre-determined acceptable threshold is between 1 and 5 percent.

In some embodiments, the respective artificial background content includes at least one of:
i) at least one uniform color,
ii) at least one color gradient, and
iii) at least one artificial image.

In some embodiments, the present invention provides for an exemplary inventive system that includes at least components of: a communication pipeline, including: at a first end of the communication pipeline: at least one first processor; where the at least one first processor is configured to: obtain a plurality of original content data units having a representative content associated with at least one subject; apply, to each original content data unit, at least one trained artificial intelligence algorithm to identify: i) the representative content associated with the at least one subject and ii) original background content that is not associated with the at least one subject; remove, from each original content data unit, the original background content to form each respective modified content data unit only having the representative content associated with the at least one subject to reduce a volume of data being transmitted resulting in an increased capacity of the communication channel; encode each respective modified content data unit in accordance with at least one data encoding-decoding methodology; and transmit each respective modified content data unit from the first end of the communication pipeline to a second end of the communication pipeline; at the second end of the communication pipeline: at least one second processor; where the at least one second processor is configured to: receive each respective modified content data unit; decode each respective modified content data unit in accordance with at least one data encoding-decoding methodology; generate, for each respective modified content data unit, a respective artificial background content; and combine, for each respective modified content data unit, the representative content associated with the at least one subject and the respective artificial background content to form each composite content data unit.

While a number of embodiments of the present invention have been described, it is understood that these embodiments are illustrative only, and not restrictive, and that many modifications may become apparent to those of ordinary skill in the art, including that the inventive methodologies, the inventive systems, and the inventive devices described herein can be utilized in any combination with each other. Further still, the various steps may be carried out in any desired order (and any desired steps may be added and/or any desired steps may be eliminated).

What is claimed is:

1. A computer-implemented method, comprising:
    at a first end of a communication pipeline:
        obtaining, by at least one first processor, a plurality of original content data units having a representative content associated with at least one subject;
        applying, by the at least one first processor, to each original content data unit, at least one trained artificial intelligence algorithm to identify:
        i) the representative content associated with the at least one subject and
        ii) original background content that is not associated with the at least one subject;
        removing, by the at least one first processor, from each original content data unit, the original background content to form each respective modified content data unit only having the representative content associated with the at least one subject to reduce a volume of data being transmitted resulting in an increased capacity of the communication channel;
        encoding, by the at least one first processor, each respective modified content data unit in accordance with at least one data encoding-decoding methodology; and
        transmitting, by the at least one first processor, each respective modified content data unit from the first end of the communication pipeline to a second end of the communication pipeline;
    at the second end of the communication pipeline:
        receiving, by at least one second processor, each respective modified content data unit;
        decoding, by the at least one second processor, each respective modified content data unit in accordance with at least one data encoding-decoding methodology;
        generating, by the at least one second processor, for each respective modified content data unit, a respective artificial background content; and
        combining, by the at least one second processor, for each respective modified content data unit, the representative content associated with the at least one subject and the respective artificial background content to form each composite content data unit.

2. The computer-implemented method of claim 1, wherein the at least one trained artificial intelligence algorithm is selected from the group consisting of:
    i) a trained convolutional neural network algorithm,
    ii) a trained feedforward neural network algorithm,
    iii) a trained recurrent neural network algorithm, and
    iv) a trained modular neural network algorithm.

3. The computer-implemented method of claim 1, wherein the trained convolutional neural network algorithm is a U-Net type trained convolutional neural network algorithm.

4. The computer-implemented method of claim 1, wherein the representative content of the at least one subject is a visual appearance of at least one person.

5. The computer-implemented method of claim 4, wherein the visual appearance of the at least one subject is a face of the at least one person.

6. The computer-implemented method of claim 5, wherein the at least one trained artificial intelligence algorithm has been trained based on a multi-dimensional morphable facial model.

7. The computer-implemented method of claim 4, wherein the at least one trained artificial intelligence algorithm has been trained based on an image database, comprising images of people that were taken at a plurality of settings and a plurality of conditions.

8. The computer-implemented method of claim 1, wherein the step of applying, to each original content data unit, the at least one trained artificial intelligence algorithm further comprises:
   assigning, by a labeling component of the at least one trained artificial intelligence algorithm, a particular label to the at least one subject,
   classifying, by a classification component of the at least one trained artificial intelligence algorithm, pixels of a visual content of each original content data unit into at least three classes:
      i) foreground pixels,
      ii) background pixels, and
      iii) unknown pixels;
   matting, by a matting component of the at least one trained artificial intelligence algorithm, the foreground pixels and the background pixels of the visual content of each original content data to an aligned average shape mask associated with the at least one subject to identify the representative content associated with the at least one subject.

9. The computer-implemented method of claim 1, wherein the method further comprising:
   training, by at least one third processor, at least one artificial intelligence algorithm based on an image database until a loss function reaches a pre-determined acceptable threshold to obtain the at least one trained artificial intelligence algorithm.

10. The computer-implemented method of claim 9, wherein the pre-determined acceptable threshold varies from 1 to 15 percent.

11. The computer-implemented method of claim 10, wherein the pre-determined acceptable threshold is between 1 and 5 percent.

12. The computer-implemented method of claim 1, wherein the respective artificial background content comprises at least one of:
   i) at least one uniform color,
   ii) at least one color gradient, and
   iii) at least one artificial image.

13. A system, comprising:
   a communication pipeline, comprising:
   at a first end of the communication pipeline:
      at least one first processor;
      wherein the at least one first processor is configured to:
         obtain a plurality of original content data units having a representative content associated with at least one subject;
         apply, to each original content data unit, at least one trained artificial intelligence algorithm to identify:
            i) the representative content associated with the at least one subject and
            ii) original background content that is not associated with the at least one subject;
         remove, from each original content data unit, the original background content to form each respective modified content data unit only having the representative content associated with the at least one subject to reduce a volume of data being transmitted resulting in an increased capacity of the communication channel;
         encode each respective modified content data unit in accordance with at least one data encoding-decoding methodology; and
         transmit each respective modified content data unit from the first end of the communication pipeline to a second end of the communication pipeline;
   at the second end of the communication pipeline:
      at least one second processor;
      wherein the at least one second processor is configured to:
         receive each respective modified content data unit;
         decode each respective modified content data unit in accordance with at least one data encoding-decoding methodology;
         generate, for each respective modified content data unit, a respective artificial background content; and
         combine, for each respective modified content data unit, the representative content associated with the at least one subject and the respective artificial background content to form each composite content data unit.

14. The system of claim 13, wherein the at least one trained artificial intelligence algorithm is selected from the group consisting of:
   i) a trained convolutional neural network algorithm,
   ii) a trained feedforward neural network algorithm,
   iii) a trained recurrent neural network algorithm, and
   iv) a trained modular neural network algorithm.

15. The system of claim 13, wherein the trained convolutional neural network algorithm is a U-Net type trained convolutional neural network algorithm.

16. The system of claim 13, wherein the representative content of the at least one subject is a visual appearance of at least one person.

17. The system of claim 16, wherein the visual appearance of the at least one subject is a face of the at least one person.

18. The system of claim 17, wherein the at least one trained artificial intelligence algorithm has been trained based on a multi-dimensional morphable facial model.

19. The system of claim 16, wherein the at least one trained artificial intelligence algorithm has been trained based on an image database, comprising images of people that were taken at a plurality of settings and a plurality of conditions.

20. The system of claim 13, wherein the at least one first processor is further configured to:
   assign, by a labeling component of the at least one trained artificial intelligence algorithm, a particular label to the at least one subject,
   classify, by a classification component of the at least one trained artificial intelligence algorithm, pixels of a visual content of each original content data unit into at least three classes:
      i) foreground pixels,
      ii) background pixels, and
      iii) unknown pixels;
   perform matting, by a matting component of the at least one trained artificial intelligence algorithm, the foreground pixels and the background pixels of the visual content of each original content data to an aligned average shape mask associated with the at least one subject to identify the representative content associated with the at least one subject.

21. The system of claim 13, wherein the system further comprises:
   at least one third processor;
   wherein the at least one third processor is configured to:
   train at least one artificial intelligence algorithm based on an image database until a loss function reaches a pre-determined acceptable threshold to obtain the at least one trained artificial intelligence algorithm.

22. The system of claim 21, wherein the pre-determined acceptable threshold varies from 1 to 15 percent.

23. The system of claim 22, wherein the pre-determined acceptable threshold is between 1 and 5 percent.

24. The system of claim 13, wherein the respective artificial background content comprises at least one of:
   i) at least one uniform color,
   ii) at least one color gradient, and
   iii) at least one artificial image.

\* \* \* \* \*